(No Model.)

O. M. KNOX.
TELEGRAPH POLE.

No. 486,974. Patented Nov. 29, 1892.

Witnesses
B. S. Ober
N. T. Riley

Inventor
O. M. Knox,
By his Attorneys,
C. A. Snow & Co.

UNITED STATES PATENT OFFICE.

ORVILLE M. KNOX, OF ONEIDA, NEW YORK.

TELEGRAPH-POLE.

SPECIFICATION forming part of Letters Patent No. 486,974, dated November 29, 1892.

Application filed September 8, 1892. Serial No. 445,369. (No model.)

*To all whom it may concern:*

Be it known that I, ORVILLE M. KNOX, a citizen of the United States, residing at Oneida, in the county of Madison and State of New York, have invented a new and useful Telegraph-Pole, of which the following is a specification.

The invention relates to improvements in telegraph-poles.

The object of the present invention is to provide a simple, inexpensive, strong, and durable pole for telegraph, telephone, and other electric wires, adapted to be readily inserted in the ground and capable of enabling cross trees or bars to be readily attached and of enabling a workman to readily ascend it.

The invention consists in the construction and novel combination and arrangement of parts hereinafter fully described, illustrated in the accompanying drawings, and pointed out in the claim hereto appended.

Figure 1:
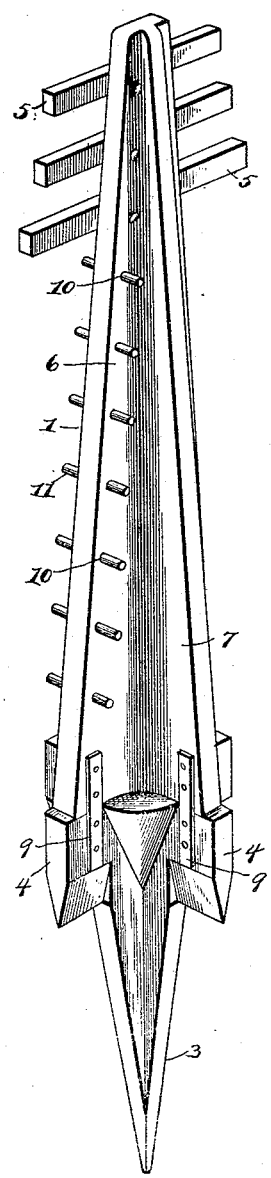
Figure 2:
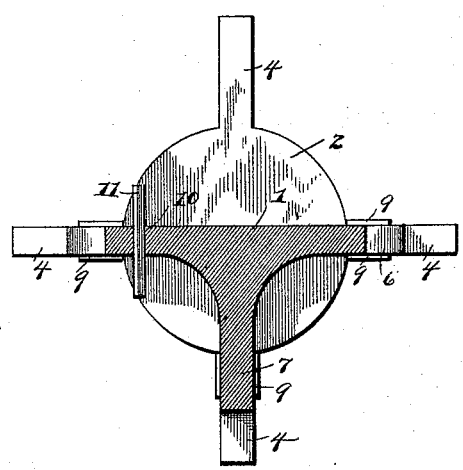

In the drawings, Figure 1 is a perspective view of a pole constructed in accordance with this invention. Fig. 2 is a horizontal sectional view.

Like numerals of reference indicate corresponding parts in all the figures of the drawings.

1 designates a metal pole mounted on a base 2, which is provided with a depending spear-shaped point 3 and has outwardly-extending wings 4. The wings 4 are vertically disposed and form lateral extensions of the flanges of the spear-point and have their lower edges sharpened by beveling, so that the base may be readily driven into the ground.

The pole is T-shaped in horizontal section and tapers from the base to its upper end, and cross trees or bars 5 are bolted to the coincident flanges 6, which form a flat surface especially adapted for the attachment of such bars. The other flange 7 extends outward at right angles to the coincident flanges 6, and the lower ends of the flanges 6 and 7 are secured by straps 9 to the base, whereby the pole is securely mounted thereon. One of the flanges 6 is provided near its outer edge with a series of horizontal perforations 10, in which are arranged horizontal pins 11, whereby a ladder is formed to enable a workman to readily ascend the pole.

It will be seen that the pole is simple and comparatively inexpensive in construction, that it may be readily driven into the ground, and that a lineman may readily climb it without the use of spurs.

What I claim is—

The combination, with the base having a spear-point and provided with outwardly-extending wings, of a pole T-shaped in horizontal section and tapering from the lower end to the top and having its coincident flanges forming a flat surface and provided in one of the flanges with a vertical series of perforations, the cross-bars secured to the flat surface formed by the coincident flanges, the horizontal pins arranged in said perforations and projecting from opposite sides of the flange and forming a ladder, and means for securing the lower end of the pole to the base, substantially as described.

In testimony that I claim the foregoing as my own I have hereto affixed my signature in the presence of two witnesses.

ORVILLE M. KNOX.

Witnesses:
 GILES HARRINGTON,
 G. R. PATTERSON.